US009036548B2

(12) United States Patent
Jayaraman et al.

(10) Patent No.: US 9,036,548 B2
(45) Date of Patent: May 19, 2015

(54) APPARATUSES AND METHODS FOR CONTROLLING ACCESS TO A RADIO ACCESS NETWORK

(75) Inventors: Venkata Ramanan Venkatachalam Jayaraman, San Diego, CA (US); Sharad Deepak Sambhwani, San Diego, CA (US); Rohit Kapoor, San Diego, CA (US); Francesco Pica, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 224 days.

(21) Appl. No.: 13/457,836

(22) Filed: Apr. 27, 2012

(65) Prior Publication Data

US 2013/0044702 A1 Feb. 21, 2013

Related U.S. Application Data

(60) Provisional application No. 61/523,769, filed on Aug. 15, 2011.

(51) Int. Cl.
*H04M 3/16* (2006.01)
*H04W 48/06* (2009.01)

(52) U.S. Cl.
CPC .................................. *H04W 48/06* (2013.01)

(58) Field of Classification Search
CPC ... H04W 8/30; H04W 56/003; H04W 56/004; H04W 56/0055; H04L 12/2472; H04L 41/5019; H04L 47/00; H04L 47/10
USPC ......... 370/230, 412, 474, 392, 473, 229, 235, 370/389, 448
See application file for complete search history.

(56) References Cited

U.S. PATENT DOCUMENTS

| 6,674,765 | B1 * | 1/2004 | Chuah et al. | 370/458 |
|---|---|---|---|---|
| 7,043,751 | B1 | 5/2006 | Fischer et al. | |
| 2006/0154680 | A1 * | 7/2006 | Kroth et al. | 455/515 |
| 2007/0047580 | A1 * | 3/2007 | Sachs et al. | 370/469 |
| 2007/0274267 | A1 * | 11/2007 | Tiedemann et al. | 370/335 |
| 2008/0165804 | A1 * | 7/2008 | Thyagarajan | 370/474 |
| 2008/0298325 | A1 * | 12/2008 | Vujcic | 370/336 |
| 2009/0186624 | A1 * | 7/2009 | Cave et al. | 455/450 |

(Continued)

OTHER PUBLICATIONS

3GPP TR 37 868 V1.0.0, 3rd Generation Partnership Project,Technical Specification Group Radio Access Network, "Study on RAN Improvements for Machine-type Communications," Release 10, Aug. 2011.

(Continued)

*Primary Examiner* — Dang Ton
*Assistant Examiner* — Sai Aung
(74) *Attorney, Agent, or Firm* — Darren M. Simon

(57) ABSTRACT

The present disclosure presents apparatuses and methods of accessing a communication network including obtaining extended access barring (EAB) data at a user equipment (UE), wherein the EAB data comprises an EAB uniform delay parameter, computing a uniform distribution parameter, determining an access bar period, wherein the access bar period is based on at least the EAB uniform delay parameter and the uniform distribution parameter, and initiating an access procedure to access the communication network after waiting at least the access bar period. Additionally, apparatuses and methods associated with a network apparatus controlling access to the communication network are also disclosed.

21 Claims, 9 Drawing Sheets

(56) References Cited

U.S. PATENT DOCUMENTS

| | | | |
|---|---|---|---|
| 2010/0069037 A1* | 3/2010 | Fischer et al. | 455/410 |
| 2010/0172299 A1* | 7/2010 | Fischer et al. | 370/328 |
| 2010/0190499 A1 | 7/2010 | Wu | |
| 2011/0039541 A1* | 2/2011 | Park et al. | 455/422.1 |
| 2011/0199898 A1 | 8/2011 | Cho et al. | |
| 2011/0244907 A1 | 10/2011 | Golaup et al. | |
| 2011/0274040 A1 | 11/2011 | Pani et al. | |
| 2011/0302310 A1 | 12/2011 | Diachina et al. | |
| 2013/0040605 A1* | 2/2013 | Zhang et al. | 455/411 |

OTHER PUBLICATIONS

3GPP TS 25.224 v10.3.0 (Sep. 2011), 3rd Generation Partnership Project; Technical Specification Group Radio Access Network; Physical layer procedures (TDD) (Release 10).

3GPP TSG-RAN WG2 #74, R2-113339, "Further Discussion on EAB," Agenda 4.3.1, May 2011.

3GPP TSG-RAN WG2 Meeting #73bis, R2-111852, "Solutions for RAN Overload Control," Agenda item 4.3.1, Apr. 2011.

"3rd Generation Partnership Project; Technical-Specification Group Services and System Aspects; Service accessibility (Release 11 )", 3GPP Standard; 3GPP TS 22.011, 3rd Generation Partnership Project (3GPP), Mobile Competence Centre ; 650, Route Des Lucioles ; F-06921 Sophiaantipolis Cedex ; France, vol. SA WG1, No. V11.0. Jun. 20, 2011, pp. 1-26, XP050553344, [retrieved on Jun. 20, 2011].

International Search Report and Written Opinion—PCT/US2012/050823—ISA/EPO—Nov. 7, 2012.

Mediatek Inc: "RAN overload handling", 3GPP Draft, R2-113083__Disc RAN Overload Handling V 0 1 , 3rd Generation Partnership Project (3GPP), Mobile Competence Centre ; 650, Route Des Lucioles ; F-06921 Sophia-Antipolis Cedex ; France, vol. RAN WG2, no. Barcelona, Spain; May 9, 2011, May 3, 2011, XP050495322, [retrieved on May 3, 2011].

Qualcomm: "EAB mechanism for RAN overload control in UMTS", 3GPP Draft; R2-114159__EAB Mechanism for RAN Overload Control in UMTS, 3rd Generation Partnership Project (3GPP), Mobile Competence Centre ; 650, Route Des Lucioles ; F-06921 Sophia-Antipolis Cedex ; France, vol. RAN WG2, no. Athens, Greece; Aug. 22, 2011, Aug. 16, 2011, XP050539980, [retrieved on Aug. 16, 2011].

Sharp: "MTC induced overload and Access Class Barring", 3GPP Draft; R2-103693, 3rd Generation Partnership Project (3GPP), Mobile Competence Centre ; 650, Route Des Lucioles ; F-06921 Sophia-Antipolis Cedex ; France, vol. RAN WG2, no. Stockholm, Sweden; Jun. 28, 2010, Jun. 22, 2010, XP050451184. [retrieved on Jun. 22, 2010].

Qualcomm Incorporated, "MTC Specific Access classes Barring", 3GPP TSG-SA WG1 #53 S1-110147, <URL:http://www.3gpp. org/ftp/tsg_sa/WG1_Serv/TSGS1_53Nashville/docs/S1-110147.zip>, Feb. 2011.

* cited by examiner

270

| TRANSMITTING A DELAY TOLERANCE INDICATOR TO A USER EQUIPMENT (UE) IN A COMMUNICATION NETWORK 272 |

| RECEIVING AN ACCESS REQUEST FROM THE UE, WHEREIN THE ACCESS REQUEST IS RECEIVED AFTER THE UE HAS WAITED AN ACCESS BAR PERIOD THAT IS A FUNCTION OF AT LEAST THE DELAY TOLERANCE INDICATOR AND A UNIFORM DISTRIBUTION PARAMETER 274 |

APPARATUSES AND METHODS FOR CONTROLLING ACCESS TO A RADIO ACCESS NETWORK

CLAIM OF PRIORITY UNDER 35 U.S.C. §119

The present Application for Patent claims priority to Provisional Application No. 61/523,769 entitled "Apparatus and Methods of Controlling Access to a Radio Access Network" filed Aug. 15, 2011, and assigned to the assignee hereof and hereby expressly incorporated by reference herein.

BACKGROUND

1. Field

Aspects of the present disclosure relate generally to wireless communication systems, and more particularly, to improving control of device random access attempts.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSDPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

Consider a cellular system that supports a large number of user equipment (UEs). In such a setting, if a significant number of the UEs attempt to connect to a RAN component, such as a base station, in a short period of time, there could be congestion in the RAN due to the UEs performing a random access procedure. For example, if a cell contains 10,000 smart meters and a significant fraction of these attempt to connect to the base station in a short duration of time, this situation could lead to high blocking probability for the other UEs in the cell and could also lead to high interference (RoT) levels.

Some prior solutions have attempted to use a geometric backoff approach to delay the initial random access attempts of the UEs so as to avoid congestion (e.g. LTE Access Class Barring/UMTS Persistence Check). While the parameters for such backoff can be set so that the access attempts of the UEs can be effectively distributed, such an approach can lead to excessive delay for a small fraction of the devices. This happens because the tail of the geometric distribution has non-zero probability even at very large values. Since in some scenarios there are a large number of devices in the system, the small fraction that experience excessively large delays can be a significant number.

Accordingly, improvements are desired for controlling access to a communication network.

SUMMARY

These and other aspects of the invention will become more fully understood upon a review of the detailed description, which follows.

In one aspect, a method of accessing a communication network includes obtaining extended access barring (EAB) data at a user equipment (UE), wherein the EAB data comprises an EAB uniform delay parameter. Further, the method may include computing a uniform distribution parameter and determining an access bar period, wherein the access bar period is based on at least the EAB uniform delay parameter and the uniform distribution parameter. According to a further aspect, the method may include initiating an access procedure to access the communication network after waiting at least the access bar period.

Other related aspects include one or more of: a computer program product including a non-transitory computer readable medium comprising at least one instruction for performing the actions of the above-noted method; at least one processor including one or more modules for performing the actions of the above-noted method; a user equipment apparatus including one or more means for performing the actions of the above-noted method; and a user equipment apparatus including at least an access manager and an extended access barring component for performing the actions of the above-noted method.

In another aspect, a method of controlling access in a communication network includes receiving a delay tolerance classification from a UE in association with a request for access to a communication network. The method further includes selecting an EAB parameter from a plurality of different EAB parameters based on at least the delay tolerance classification. Additionally, the method includes transmitting the EAB uniform delay parameter to the UE, wherein the EAB uniform delay parameter causes the UE to wait an access bar period that based on at least the EAB uniform delay parameter and a uniform distribution parameter.

Other related aspects include one or more of: a computer program product including a non-transitory computer readable medium comprising at least one instruction for performing the actions of the above-noted method; at least one processor including one or more modules for performing the actions of the above-noted method; a network apparatus including one or more means for performing the actions of the above-noted method; and a network apparatus including at least an controller for performing the actions of the above-noted method.

In another aspect, a method of controlling access in a communication network includes transmitting a delay tolerance indicator to a UE in a communication network. Additionally, the method includes receiving an access request from the UE, wherein the access request is received after the UE has waited an access bar period that is based on at least the delay tolerance indicator and a uniform distribution parameter.

Other related aspects include one or more of: a computer program product including a non-transitory computer readable medium comprising at least one instruction for performing the actions of the above-noted method; at least one processor including one or more modules for performing the actions of the above-noted method; a network apparatus including one or more means for performing the actions of the

DETAILED DESCRIPTION

The described apparatus and methods include one or more user equipment (UEs) executing an extended access barring component to control accessing a node or other component of communication network, such as, but not limited to, a radio access network (RAN) by waiting for expiration of an access bar period, determined based on uniform distribution parameter, before attempting access. For example, in a system having a plurality of UEs, the operation of access barring component in all or some portion of the plurality of UEs results in a substantially even distribution of access attempts received by the node from the plurality of UEs. Therefore, in an aspect, the described apparatus and methods reduce or avoid congestion and/or interference (RoT) levels and/or delays or blockages of access to the node and/or the RAN.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
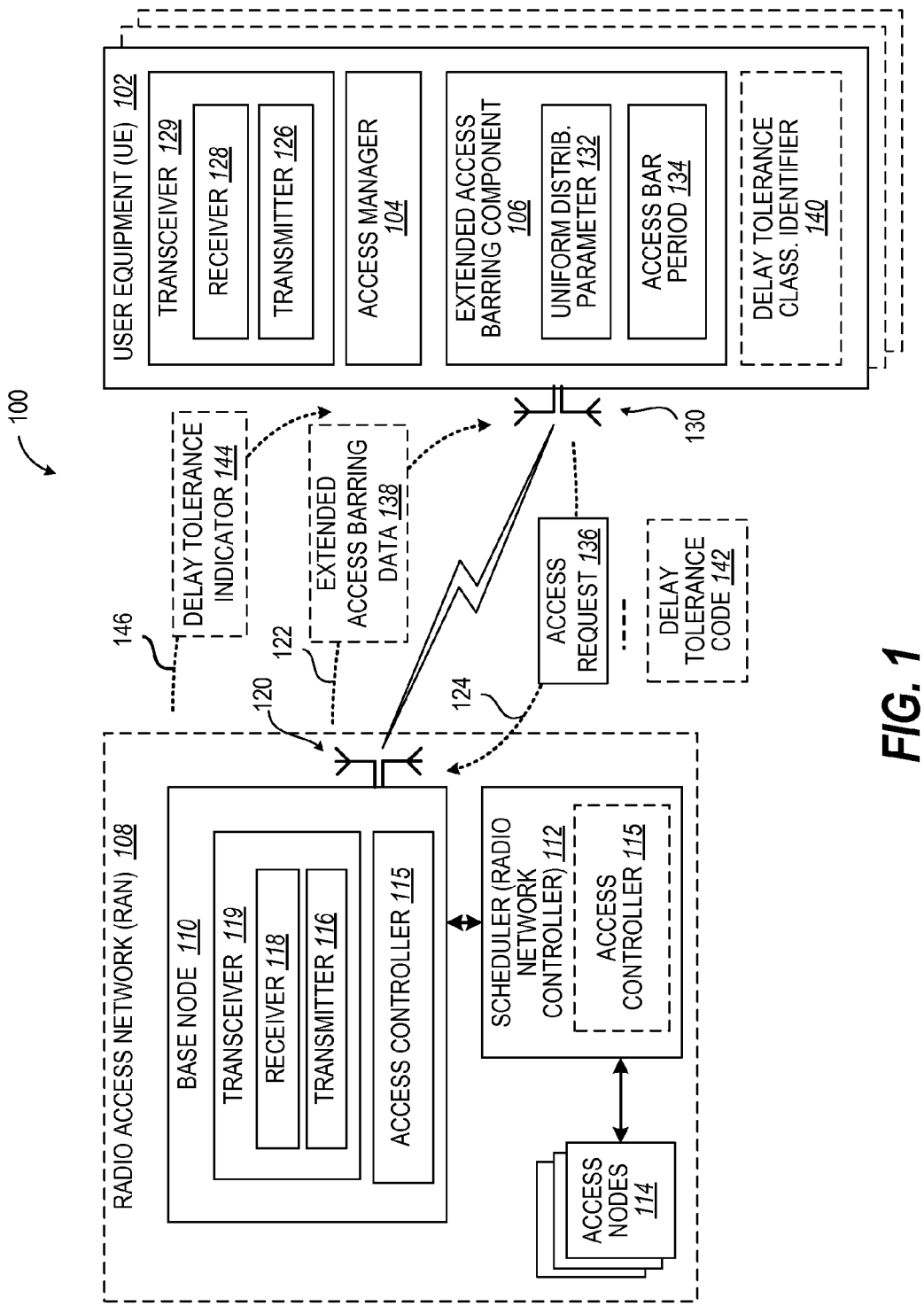
FIG. 1 is a schematic diagram of one aspect of a system for controlling access to a communication network.

With reference to FIG. 1, in one aspect of a cellular communication system 100, one or more user apparatus, depicted as UE 102, each include an access manager 104 having an extended access barring component 106 to control accessing an RAN 108. RAN 108 includes a base node, or merely node 110, that is currently serving the UE 102. A scheduler, such as a Radio Network Controller (RNC) 112, communicates scheduling to the node 110 as well as to other access nodes 114. Node 110 and/or RNC 112 include an access controller 115 that controls providing access, e.g. connections, to one or more UEs, such as UE 102, requesting access to or a connection with node 110. The node 110 has a transceiver 119, including a transmitter 116 and receiver 118, for communicating via one or more antennas 120 with the UE 102 respectively on a downlink 122 and an uplink 124. Similarly, the UE 102 has a transceiver 129, including a transmitter 126 and receiver 128, for communicating via one or more antennas 130 with the node 110 respectively on the uplink 124 and the downlink 122. In an aspect, each of UEs 102 may be any type of wireless communication device, including a machine-type-communication (MTC) device. In an aspect, a plurality of UEs 102 may be MTC devices, such as but not limited to smart meters.

In an aspect, extended access barring (EAB) component 106 includes a uniform distribution parameter 132 and is executable by UE 102 to cause access manager 104 to wait an access bar period 134, which is a function of at least the uniform distribution parameter 132, before initiating an access procedure to access node 110 of RAN 108. Access bar period 134 may include, for example, an amount of time or a number of paging cycles. For instance, uniform distribution parameter 132 may include, but is not limited to, a selected random number in an interval between zero and a uniform delay spread value. In an aspect, the uniform delay spread value may be set, for example, by an operator of the network. So, for example, after waiting access bar period 134, access manager 104 may generate an access request 136 and cause transmission of access request 136 over uplink 124 to access node 110. Further, for example, uplink 124 may include a random access channel, and the access procedure may be a random access channel (RACH) procedure.

Optionally, in an aspect, access bar period 134 may additionally be a function of EAB data 138. EAB data 138 may be a plurality of information, or a code or bit value, which may be obtained from node 110 or RAN 108, pre-configured on UE 102, or which UE 102 may calculate to result in the largest delay UE 102 can tolerate. For instance, in one aspect that should not be construed as limiting, EAB data 138 may be included in a system information block (SIB) message transmitted by node 110. For example, in an aspect, EAB data 138 may be an EAB uniform delay parameter having a value that varies as a function, such as but not limited to an average, of a number of access attempts received by a base station, such as node 110, in RAN 108. Further, for example, in another aspect, EAB data 138 may be an EAB uniform delay parameter having a value that varies as a function of a total number of devices in a cell, a number of signatures available for RACH procedures, and a determined amount of time, such as but not limited to an average, a device occupies a RACH signature in order to complete an uplink transmission. In one specific aspect, for example, EAB data 138 may include an EAB uniform delay parameter determined based on the following equation:

$$W > \frac{N*T}{S}$$

wherein W is the EAB uniform delay parameter, N is the total number of devices in a cell, S is the number of signatures available for RACH, and T is the determined amount of time each device occupies the RACH signature in order to complete the uplink transmission.

Optionally, in an aspect, EAB data 138 may additionally be a function of a random access attempt intensity of connections a core network can support from a cell. In one specific aspect, for example, EAB data 138 may include an EAB uniform delay parameter determined based on the following equation:

$$W > \max\left(\frac{N}{G}, \frac{N*T}{S}\right)$$

wherein W is the EAB uniform delay parameter, N is the total number of devices in a cell, S is the number of signatures available for RACH, and T is the determined amount of time the device occupies the RACH signature in order to complete the uplink transmission, and G is the random access attempt intensity of connections the core network can support from the cell.

In an additional aspect, EAB data 138 may include one or more access permission values corresponding to one or more EAB classes. For example, RAN 108 may broadcast an EAB bitmap in EAB data 138 that may include access permission values corresponding to one or more EAB classes. In an aspect, a first access permission value may indicate that RAN access is barred for a particular EAB class. Additionally, a second access permission value may indicate that RAN access is allowed and/or RAN access is allowed immediately. Furthermore, a third access permission value may indicate that RAN access is allowed and is based on an EAB uniform delay parameter, which may also be included in EAB data 138. Thus, the UE 102 may determine, based at least on the EAB class of the UE 102 and the plurality of access permission values in the EAB bitmap, (1) whether communication network access is allowed for the UE EAB class and if such access is allowed, (2) whether access is allowed immediately or only after the UE waits a access bar period based on at least the EAB uniform delay parameter in the EAB data.

Optionally, in an aspect, extended access barring component 106 may cause access manager 104 to wait until a next paging wake up time, after waiting access bar period 134, before the initiating of the access procedure to access node 110 and/or RAN 108. In another optional aspect, UE 102 may have a delay tolerance classification identifier 140, which defines a level of delay acceptable to UE 102, and which may influence access bar period 134. For example, delay tolerance classification identifier 140 may be one of a plurality of delay tolerance classification identifiers that each defines a different level of delay tolerance. As such, in an aspect, the described apparatus and methods may include a plurality of different access bar periods each corresponding to a respective one of the plurality of delay tolerance classification identifiers, thereby defining a plurality of different access bar periods. In some aspects, the plurality of access bar periods may be based on or may result from a plurality of different uniform distribution parameters each corresponding to one of the plurality of delay tolerance classification identifiers. In some aspects, the plurality of access bar periods may be based on or may result from a plurality of different EAB data, or EAB parameters, each corresponding to one of the plurality of delay tolerance classification identifiers. In some aspects, the plurality of access bar periods may be based on or may result from a combination of the plurality of different uniform distribution parameters and plurality of different EAB data, or EAB parameters.

Optionally, in another additional aspect, UE 102 may include a delay tolerance code 142 when attempting to connect to node 110 or RAN 108. For example, in an aspect, UE 102 may include delay tolerance code 142 in access request 136, which may include a radio resource control (RRC) connection request. In one aspect, delay tolerance code 142 may be any code that identifies UE 102 as having an access attempt delay tolerance, or as being capable of extended access barring. For example, delay tolerance code 142 may include, but is not limited to, and establishment cause equal to "Delay Tolerant" in the RRC connection request. In another aspect, delay tolerance code 142 may alternatively or additionally represent delay tolerance classification identifier 140 of UE 102. In response to an access or connection request including delay tolerance code 142, node 110 or another component of RAN 108, such as RNC 112, can execute access controller 115 and respond to UE 102, such as with an access rejection message that includes EAB data 138 or other wait information, such as Rel-10 Wait Timer information, which may vary depending on delay tolerance code 142.

Optionally, in another additional aspect, node 110 may transmit a delay tolerance indicator 144 to UE 102 to indicate an ability of node 110 to support delay tolerant access procedures as described herein. In an aspect, delay tolerance indicator 144 may be transmitted via a broadcast 146 to any UEs, including UE 102, in a cell of node 110. For example, delay tolerance indicator 144 may include, but is not limited to, a flag in broadcast 146. The receipt of delay tolerance indicator 144 allows UE 102 to determine, such as by execution of access manager 104, that RAN 108 and/or node 110 is a network that supports delay tolerant access procedures, and is not a legacy network. As a result, when UE 102 attempts to access or connect to node 110 or RAN 108 that is known to be a legacy network, such as based on lack of transmitting delay tolerance indicator 144 to UE 102, UE 102 will not request RRC connections with an unknown cause (decoded as "reserved") in such a legacy network, which would otherwise result in unspecified behavior.

In one use case, for example, a network apparatus such as RNC 112 or node 110 can configure different EAB data 138, for example different EAB classifications and corresponding parameters (also referred to as "EAB rules"), based on current congestion situations or at certain "expected" congestion times. As such, all UEs having a certain EAB classification, e.g. delay tolerance classification identifier 140, that are camping on a cell supported by node 110 broadcasting EAB data 138 will act according to the defined EAB rules corresponding to their classification.

In another use case, for example, a network apparatus such as RNC 112 or node 110 can execute access controller 115 to modify existing EAB data 138, and broadcast new EAB data 138, in response to UEs accessing RAN 108, e.g. node 110. For example, access controller 115 may include one or more EAB algorithms that take into account one or more factors, as discussed herein, to modify EAB data 138. In an aspect, when RAN 108, e.g. node 110, receives RRC connection request indicating "delay tolerant" in their establishment case, then access controller 115, e.g. via EAB algorithm, may cause RAN 108, e.g. node 110, to start rejecting RRC requests using an extended Wait timer, such as a Rel-10 extended Wait Timer, as per legacy rules, and as an optional addition, may also start modifying EAB data 138.

Optionally, in another additional aspect, the described apparatus and methods may include access manager 104 or extended access barring component 106 causing UE 102 to re-read a previously received SIB message in response to determining to access the communication network and prior to transmitting an access request, wherein the previously received SIB message includes at least one EAB parameter. As such, access bar period 134 is additionally a function of the at least one EAB uniform delay parameter in the re-read SIB message.

Optionally, in another additional aspect, the operation of the described apparatus and methods may vary based on one or any combination of a service domain (e.g. circuit switched (CS) or packet switched (PS)), a mobile originated (MO) or a mobile terminated (MT) access type, a call type (e.g. registration or call setup), a service type (e.g. SMS, MMTel), or a radio resource control (RRC) state, such as an idle state or a connected state. Moreover, the operation of the described apparatus and methods based on any of the above factors may be common for all classes, e.g. delay tolerance classification identifier 140, of UEs or different per class.

Thus, the described apparatus and methods include one or more UEs 102 executing extended access barring component 106 to control accessing node 110 and/or RAN 108 by waiting access bar period 134, determined based on uniform distribution parameter 132. For system 100 including a plurality of UEs 102, the operation of access barring component 106 in all or some portion of the plurality of UEs 102 results in substantially evenly distributing access attempts of the plurality of UEs 102. Therefore, in an aspect, the described apparatus and methods reduce or avoid congestion and/or interference (RoT) levels and/or delays or blockages of access to node 110 and/or RAN 108.

Figure 2A:
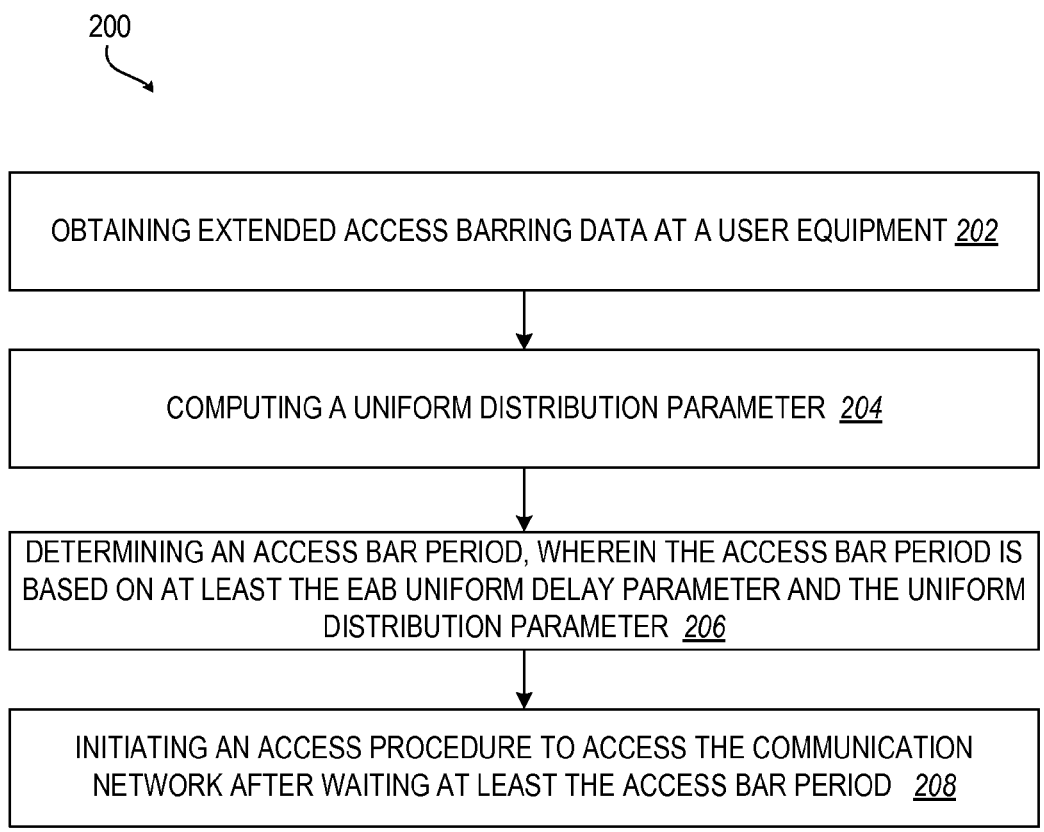
FIG. 2A is a flowchart of one aspect of a method of accessing a communication network.

Referring to FIG. 2A, in an aspect of operation of system 100 (FIG. 1), a method 200 of accessing a communication network includes obtaining EAB data at a UE (Block 202). Method 200 may further include computing a uniform distribution parameter (Block 204). Also, method 200 may include determining an access bar period, wherein the access bar period is based on at least the EAB uniform delay parameter and the uniform distribution parameter (Block 206). Additionally, method 200 may include initiating an access procedure to access the communication network after waiting at least the access bar period (Block 208).

Figure 2B:
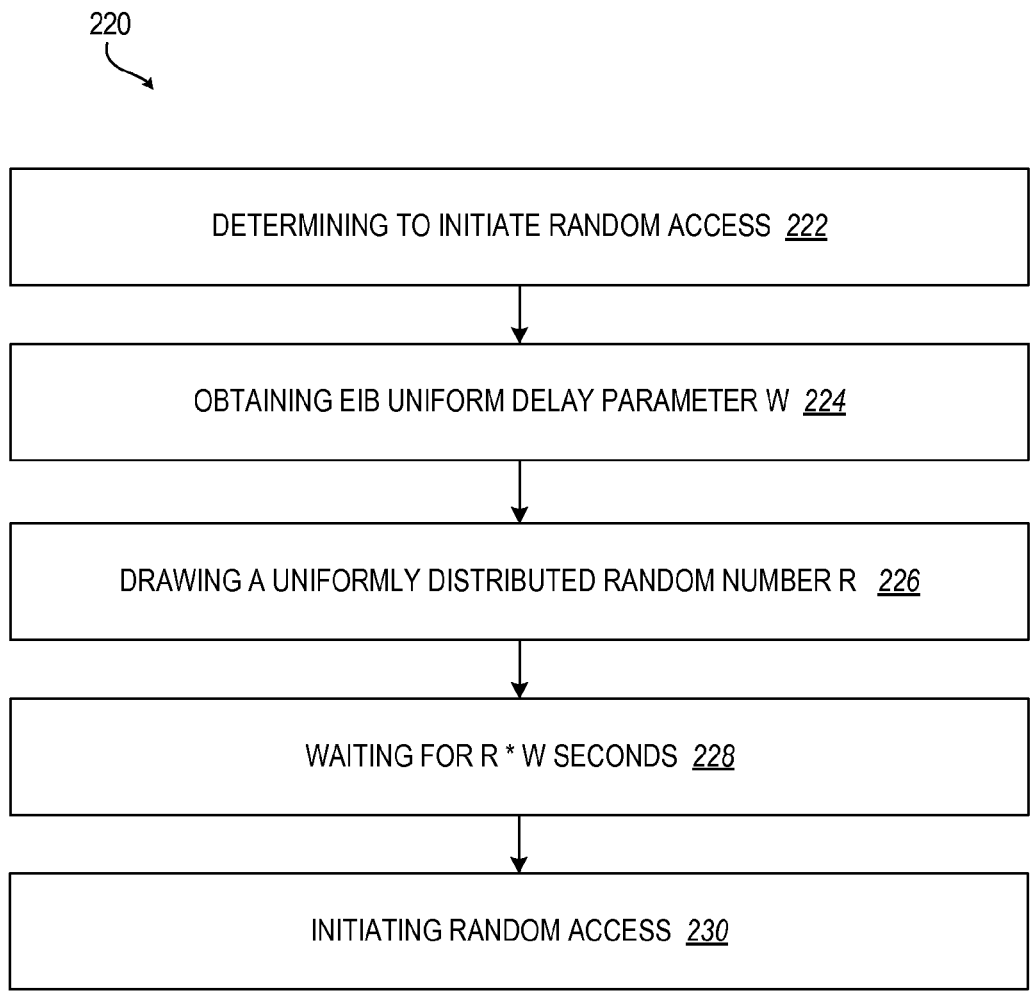
FIG. 2B is a flowchart of one aspect of a method of accessing a communication network.

Referring to FIG. 2B, in one example of method 200 (FIG. 2A), such as, but not limited to application in a UTRAN Rel-11 UMTS system having an EAB mechanism as described herein, an implementation-specific method 220 includes determining to initiate Random Access (Block 222). Further, implementation-specific method 220 includes obtaining EAB uniform delay parameter W (Block 224). For example, EAB uniform delay parameter W may be transmitted by base station. Also, implementation-specific method 220 includes drawing a uniformly distributed random number R (Block 226). Moreover, implementation-specific method 220 includes waiting for R*W seconds (Block 228). Additionally, implementation-specific method 220 includes initiating random access (Block 230).

For example, the methodology of FIG. 2B may be illustrated by a use case that results in delaying the initial random access attempt of the UEs by use of a uniform probability distribution. Prior to initiating random access, the UE may generate a random number, R, e.g. uniformly distributed between 0 and 1. The UE may then wait for R multiplied by W (R*W seconds), where W is may be signaled from the base station, e.g. node 110, and then may initiate the random access procedure. Note that in this procedure, the maximum delay experienced by any device is W seconds.

In an aspect, the EAB uniform delay parameter W may be signaled from the base station, e.g. node 110, although the UE 102 may obtain W in other ways, as described above. In any case, this provides a means by which the base station can directly control the intensity of random access attempts. If there are N devices in the cell, the intensity of random access attempts (i.e. number of random access attempts per second) will be no greater than:

$$\frac{N}{W}$$

when the number of devices, N, is large.

Thus, when the cell experiences low random access intensity, the base-station could reduce EAB uniform delay parameter W, and when the cell experiences high random access intensity, the base-station could increase W to cope with increased load.

For example, in an UMTS system, the base-station could estimate W in the following manner. Let N be the total number of devices in a cell, S be the number of signatures available for a random access channel, T be the average time (in seconds) an UE occupies a RACH signature in order to complete uplink transmission. Then, an upper bound on the intensity of random access attempts the RAN network can handle is $$\frac{S}{T}$$

Hence, in order to avoid RAN congestion, the base-station can choose W so that the actual random access intensity is less than the value above, e.g.:

$$\frac{N}{W} < \frac{S}{T}$$

which leads to:

$$W > \frac{N*T}{S}$$

If, in addition, the core network can only support random access attempt intensity of G connections per second from a cell, then W can be set to ensure that the actual random access intensity is less than:

$$\min\left(\frac{S}{T}, G\right)$$

as such:

$$W > \max\left(\frac{N}{G}, \frac{N*T}{S}\right)$$

Optionally, as noted above, these aspects may optionally further include a categorization of the UEs based on the level of delay acceptable to each of them. In this case, the base station could transmit several parameters $W_1, W_2, \ldots, W_n$ and the UE may set its EAB uniform delay parameter W to be W, if it belongs to category i. This modification allows for providing various levels of delay guarantees to the different UEs.

In the proposal above, a delay that is uniformly distributed in the interval [0,W] seconds may be used before initiating an access attempt. After this delay, the UE may be allowed to initiate random access immediately. In another optional aspect, instead of allowing the UE to initiate access immediately, the described aspects may cause the UE to wait until its paging wake up time (e.g., in a UMTS system).

Further, instead of forcing the UE to wait for R*W seconds, in one optional aspect the described apparatus and methods can cause the UE to wait for R*W paging cycles, allowing the UE to initiate access only in the subsequent paging wake up time (e.g., in a UMTS system).

Additionally, as mentioned above, the EAB uniform delay parameter W need not be transmitted by the base station. The value might be hardcoded in the UE or the UE might choose to simply set W to be the largest delay it can tolerate. Further, in some aspects, different values of W could be hardcoded, obtained, or otherwise set for use by different delay tolerant classes of UEs.

Figure 2C:
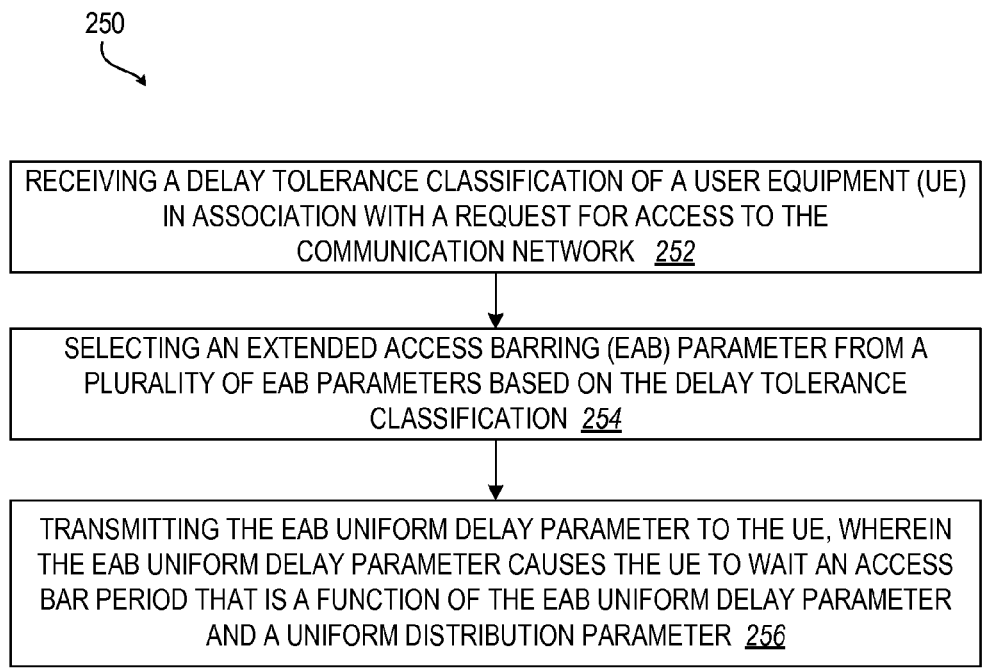
FIG. 2C is a flowchart of one aspect of a method of controlling access to a communication network.

Referring to FIG. 2C, in one aspect of operation of a network apparatus, such as node 110 and/or RNC 112 in RAN 108 (FIG. 1), method 250 of controlling access in a communication network includes receiving a delay tolerance classification of a UE in association with a request for access to a communication network, such as, but not limited to, a radio access network (Block 252). Further, method 250 includes selecting an EAB parameter from a plurality of different EAB parameters based on the delay tolerance classification (Block 254). Additionally, method 250 includes transmitting the EAB uniform delay parameter to the UE, wherein the EAB uniform delay parameter causes the UE to wait an access bar period that is a function of the EAB uniform delay parameter and a uniform distribution parameter (Block 256).

Figure 2D:
FIG. 2D is a flowchart of one aspect of a method of controlling access to a communication network.

Referring to FIG. 2D, in one aspect of operation of a network apparatus, such as node 110 and/or RNC 112 in RAN 108 (FIG. 1), a method 270 of controlling access in a communication network includes transmitting a delay tolerance indicator to a UE in a communication network, such as, but not limited to, a radio access network (Block 272). Additionally, method 270 includes receiving an access request from the UE, wherein the access request is received after the UE has waited an access bar period that is a function of at least the delay tolerance indicator and a uniform distribution parameter (Block 274).

Figure 3:
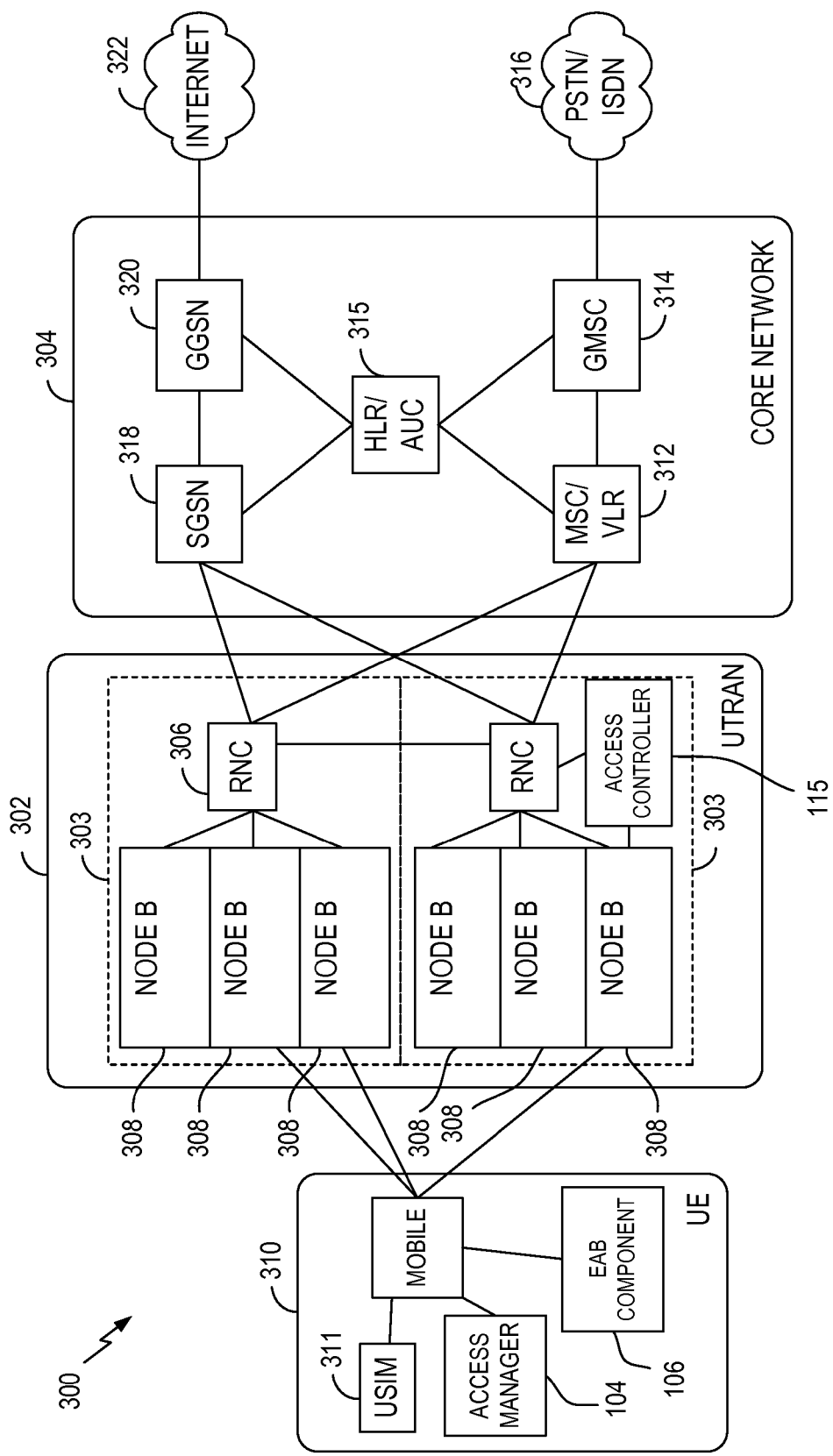
FIG. 3 is a diagram illustrating an example of one aspect of a hardware implementation for an apparatus employing a processing system according to the system of FIG. 1.

The various concepts presented throughout this disclosure may be implemented across a broad variety of telecommunication systems, network architectures, and communication standards. By way of example and without limitation, the aspects of the present disclosure illustrated in FIG. 3 are presented with reference to a UMTS system 300 employing a W-CDMA air interface. A UMTS network includes three interacting domains: a Core Network (CN) 304, a UMTS Terrestrial Radio Access Network (UTRAN) 302, and User Equipment (UE) 310. In this example, the UTRAN 302 provides various wireless services including telephony, video, data, messaging, broadcasts, and/or other services. The UTRAN 302 may include a plurality of Radio Network Subsystems (RNSs) such as an RNS 303, each controlled by a respective Radio Network Controller (RNC) such as an RNC 306. Here, the UTRAN 302 may include any number of RNCs 306 and RNSs 303 in addition to the RNCs 306 and RNSs 303 illustrated herein. The RNC 306 is an apparatus responsible for, among other things, assigning, reconfiguring and releasing radio resources within the RNS 303. The RNC 306 may be interconnected to other RNCs (not shown) in the UTRAN 302 through various types of interfaces such as a direct physical connection, a virtual network, or the like, using any suitable transport network.

Communication between a UE 310 and a NodeB 308 may be considered as including a physical (PHY) layer and a medium access control (MAC) layer. Further, communication between a UE 310 and an RNC 306 by way of a respective NodeB 308 may be considered as including a radio resource control (RRC) layer. In the instant specification, the PHY layer may be considered layer 1; the MAC layer may be considered layer 2; and the RRC layer may be considered layer 3. Information herein below utilizes terminology introduced in Radio Resource Control (RRC) Protocol Specification, 3GPP TS 25.331 v9.1.0, incorporated herein by reference.

The geographic region covered by the SRNS 303 may be divided into a number of cells, with a radio transceiver apparatus serving each cell. A radio transceiver apparatus is commonly referred to as a NodeB in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three NodeBs 308 are shown in each SRNS 303; however, the SRNSs 303 may include any number of wireless NodeBs. The NodeBs 308 provide wireless access points to a core network (CN) 304 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 310 may further include a universal subscriber identity module (USIM) 311, which contains a user's subscription information to a network. For illustrative purposes, one UE 310 is shown in communication with a number of the NodeBs 308. The downlink (DL), also called the forward link, refers to the communication link from a NodeB 308 to a UE 310, and the uplink (UL), also called the reverse link, refers to the communication link from a UE 310 to a NodeB 308.

The core network 304 interfaces with one or more access networks, such as the UTRAN 302. As shown, the core network 304 is a GSM core network. However, as those skilled in the art will recognize, the various concepts presented throughout this disclosure may be implemented in a RAN, or other suitable access network, to provide UEs with access to types of core networks other than GSM networks.

The core network 304 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the core network 304 supports circuit-switched services with a MSC 312 and a GMSC 314. In some applications, the GMSC 314 may be referred to as a media gateway (MGW). One or more RNCs, such as the RNC 306, may be connected to the MSC 312. The MSC 312 is an apparatus that controls call setup, call routing, and UE mobility functions. The MSC 312 also includes a visitor location register (VLR) that contains subscriber-related information for the duration that a UE is in the coverage area of the MSC 312. The GMSC 314 provides a gateway through the MSC 312 for the UE to access a circuit-switched network 316. The GMSC 314 includes a home location register (HLR) 315 containing subscriber data, such as the data reflecting the details of the services to which a particular user has subscribed. The HLR is also associated with an authentication center (AuC) that contains subscriber-specific authentication data. When a call is received for a particular UE, the GMSC 314 queries the HLR 315 to determine the UE's location and forwards the call to the particular MSC serving that location.

The core network 304 also supports packet-data services with a serving GPRS support node (SGSN) 318 and a gateway GPRS support node (GGSN) 320. GPRS, which stands for General Packet Radio Service, is designed to provide packet-data services at speeds higher than those available with standard circuit-switched data services. The GGSN 320 provides a connection for the UTRAN 302 to a packet-based network 322. The packet-based network 322 may be the Internet, a private data network, or some other suitable packet-based network. The primary function of the GGSN 320 is to provide the UEs 310 with packet-based network connectivity. Data packets may be transferred between the GGSN 320 and the UEs 310 through the SGSN 318, which performs primarily the same functions in the packet-based domain as the MSC 312 performs in the circuit-switched domain.

The UMTS air interface is a spread spectrum Direct-Sequence Code Division Multiple Access (DS-CDMA) system. The spread spectrum DS-CDMA spreads user data through multiplication by a sequence of pseudorandom bits called chips. The W-CDMA air interface for UMTS is based on such direct sequence spread spectrum technology and additionally calls for a frequency division duplexing (FDD). FDD uses a different carrier frequency for the uplink (UL) and downlink (DL) between a NodeB 308 and a UE 310. Another air interface for UMTS that utilizes DS-CDMA, and uses time division duplexing, is the TD-SCDMA air interface. Those skilled in the art will recognize that although various examples described herein may refer to a WCDMA air interface, the underlying principles are equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 310 provides feedback to the NodeB 308 over the HS-DPCCH to indicate whether it correctly decoded a packet on the downlink.

HS-DPCCH further includes feedback signaling from the UE 310 to assist the NodeB 308 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the NodeB 308 and/or the UE 310 may have multiple antennas supporting MIMO technology. The use of MIMO technology enables the NodeB 308 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput. On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

UE 310 can incorporate access manager 104 and extended access barring component 106 (FIG. 1) to perform at least one of methodology 200 or methodology 220, and other aspects as described herein. The UTRAN 302 can incorporate access controller 115 (FIG. 1) to perform at least one of methodology 250 or methodology 270, and other aspects as described herein.

Figure 4:
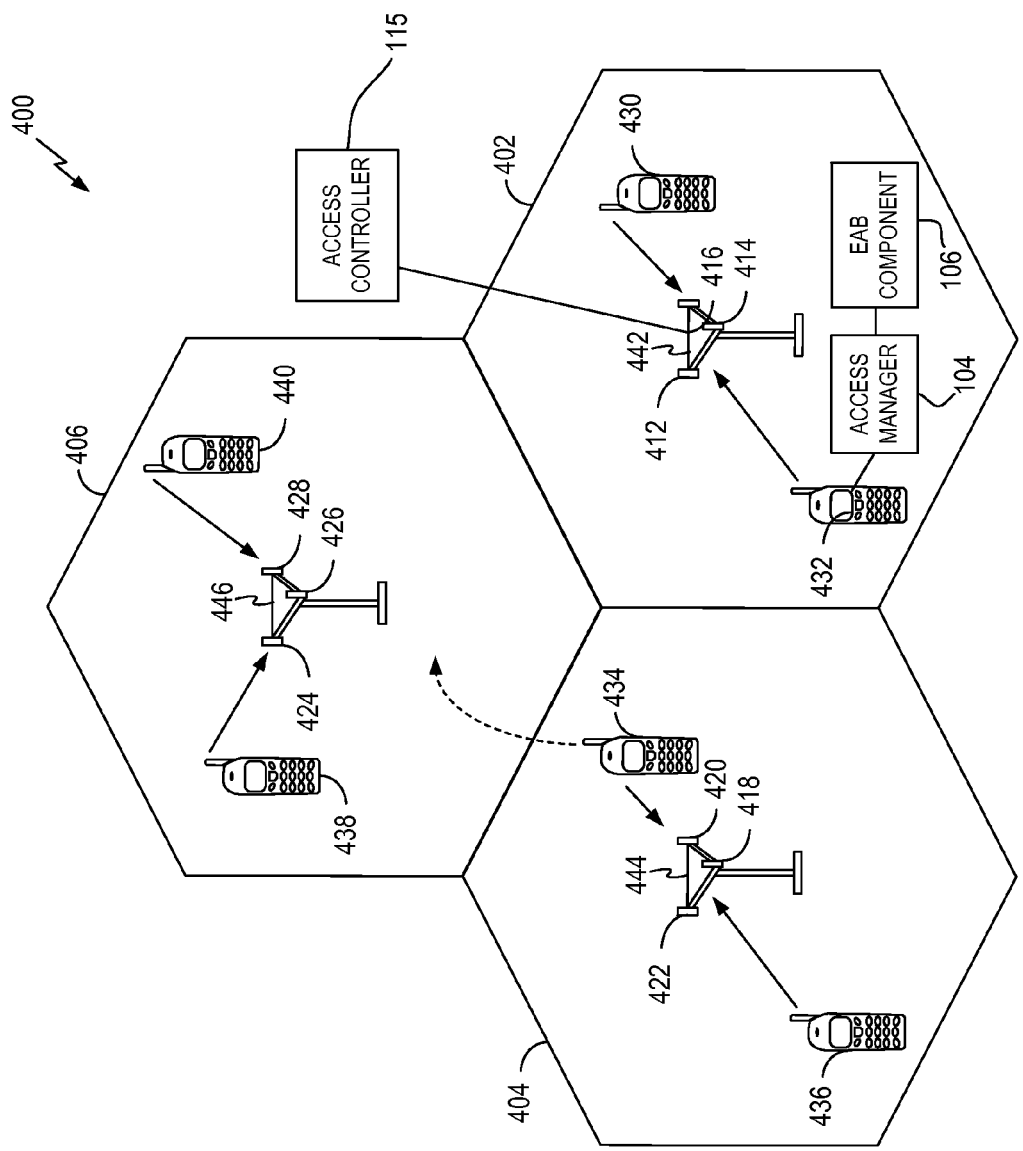
FIG. 4 is a block diagram conceptually illustrating an example of one aspect of a telecommunications system according to the system of FIG. 1.

Referring to FIG. 4, an access network 400 in a UTRAN architecture is illustrated. The multiple access wireless communication system includes multiple cellular regions (cells), including cells 402, 404, and 406, each of which may include one or more sectors. The multiple sectors can be formed by groups of antennas with each antenna responsible for communication with UEs in a portion of the cell. For example, in cell 402, antenna groups 412, 414, and 416 may each correspond to a different sector. In cell 404, antenna groups 418, 420, and 422 each correspond to a different sector. In cell 406, antenna groups 424, 426, and 428 each correspond to a different sector. The cells 402, 404 and 406 may include several wireless communication devices, e.g., User Equipment or UEs, which may be in communication with one or more sectors of each cell 402, 404 or 406. For example, UEs 430 and 432 may be in communication with NodeB 442, UEs 434 and 436 may be in communication with NodeB 444, and UEs 438 and 440 can be in communication with NodeB 446. Here, each NodeB 442, 444, 446 is configured to provide an access point to a core network for all the UEs 430, 432, 434, 436, 438, 440 in the respective cells 402, 404, and 406.

As the UE 434 moves from the illustrated location in cell 404 into cell 406, a serving cell change (SCC) or handover may occur in which communication with the UE 434 transitions from the cell 404, which may be referred to as the source cell, to cell 406, which may be referred to as the target cell. Management of the handover procedure may take place at the UE 434, at the NodeBs corresponding to the respective cells, at a radio network controller 406, or at another suitable node in the wireless network. For example, during a call with the source cell 404, or at any other time, the UE 434 may monitor various parameters of the source cell 404 as well as various parameters of neighboring cells such as cells 406 and 402. Further, depending on the quality of these parameters, the UE 434 may maintain communication with one or more of the neighboring cells. During this time, the UE 434 may maintain an Active Set, that is, a list of cells that the UE 434 is simultaneously connected to (i.e., the UTRA cells that are currently assigning a downlink dedicated physical channel DPCH or fractional downlink dedicated physical channel F-DPCH to the UE 434 may constitute the Active Set).

The modulation and multiple access scheme employed by the access network 400 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

UE 432 can incorporate access manager 104 and extended access barring component 106 (FIG. 1) to perform at least one of methodology 200 or methodology 220, and other aspects as described herein. The NodeB 442 can similarly incorporate access controller 115 (FIG. 1) to perform at least one of methodology 250 or methodology 270, and other aspects as described herein.

Figure 5:
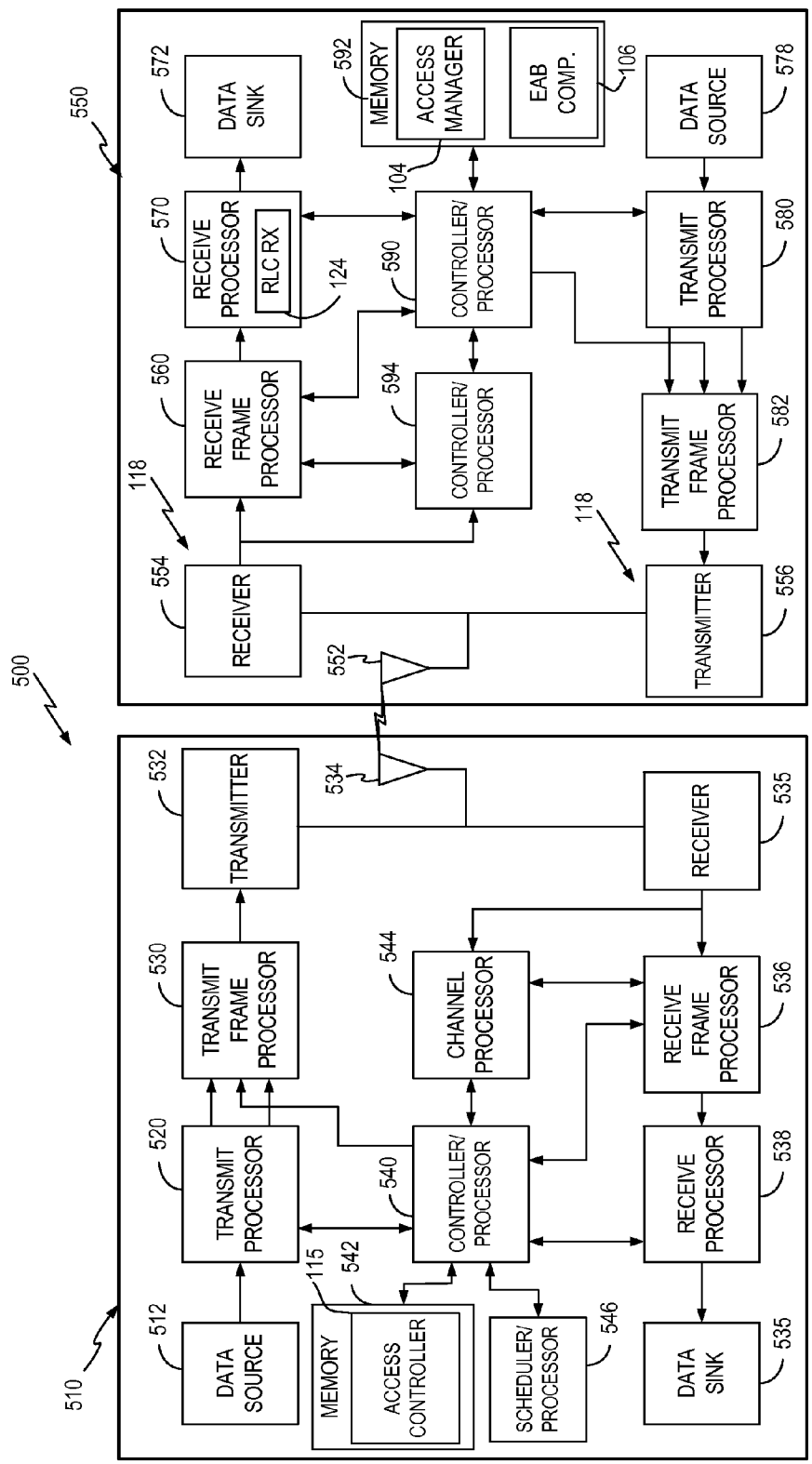
FIG. 5 is a conceptual diagram illustrating an example of one aspect of an access network according to the system of FIG. 1.

FIG. 5 is a block diagram of a NodeB 510 in communication with a UE 550, where the NodeB 510 may be the NodeB 500 (FIG. 5), and the UE 550 may be the UE 514 (FIG. 5). In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the NodeB 510. More specifically, the receive processor 570 descrambles and despreads the symbols, and then determines the most likely signal constellation points transmitted by the NodeB 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the NodeB 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the NodeB 510 or from feedback contained in the midamble transmitted by the NodeB 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the NodeB 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 535 and the controller/processor, respectively. If some of the frames were unsuccessfully decoded by the receive processor, the controller/processor 540 may also use an acknowledgement (ACK) and/or negative acknowledgement (NAK) protocol to support retransmission requests for those frames.

The controller/processors 540 and 590 may be used to direct the operation at the NodeB 510 and the UE 550, respectively. For example, the controller/processors 540 and 590 may provide various functions including timing, peripheral interfaces, voltage regulation, power management, and other control functions. The computer readable media of memories 542 and 592 may store data and software for the NodeB 510 and the UE 550, respectively. A scheduler/processor 546 at the NodeB 510 may be used to allocate resources to the UEs and schedule downlink and/or uplink transmissions for the UEs.

UE 550 can incorporate access manager 104 and extended access barring component 106 (FIG. 1) to perform at least one of methodology 200 or methodology 220, and other aspects as described herein. The NodeB 510 can similarly incorporate access controller 115 (FIG. 1) to perform at least one of methodology 250 or methodology 270, and other aspects as described herein.

Figure 6:
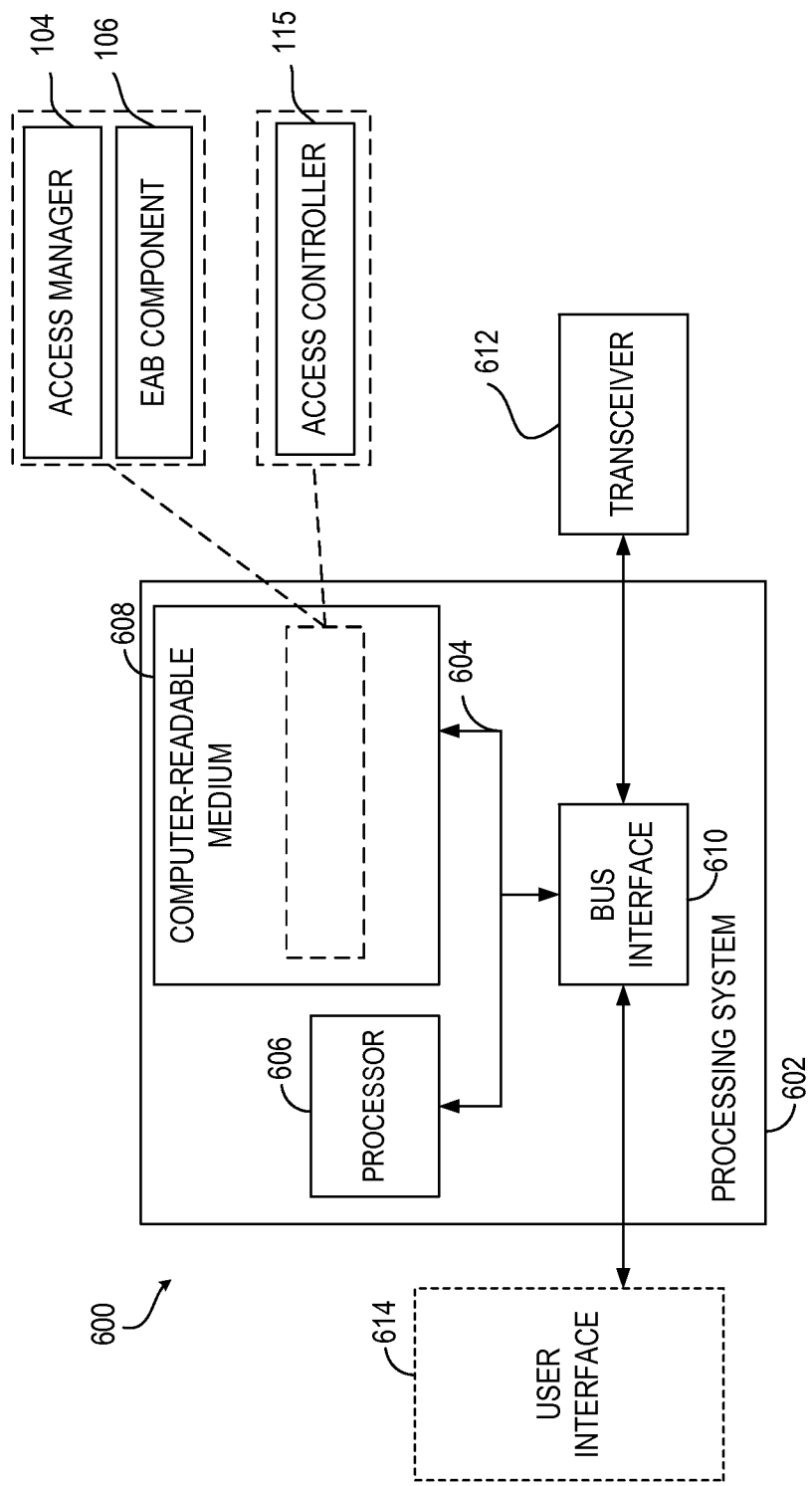
FIG. 6 is a block diagram conceptually illustrating an example of one aspect of a Node B in communication with one aspect of a UE in a telecommunications system according to the system of FIG. 1.

FIG. 6 is a conceptual diagram illustrating an example of a hardware implementation for an apparatus 600 employing a processing system 602, such as for a network apparatus, e.g. node 110 or RNC 112 of RAN 108 (FIG. 1), or a user apparatus, e.g. user equipment 102 (FIG. 1). In this example, the processing system 602 may be implemented with a bus architecture, represented generally by the bus 604. The bus 604 may include any number of interconnecting buses and bridges depending on the specific application of the processing system 602 and the overall design constraints. The bus 604 links together various circuits including one or more processors, represented generally by the processor 606, and computer-readable media, represented generally by the computer-readable medium 608. The bus 604 may also link various other circuits such as timing sources, peripherals, voltage regulators, and power management circuits, which are well known in the art, and therefore, will not be described any further. A bus interface 610 provides an interface between the bus 604 and a transceiver 612. The transceiver 612 provides a means for communicating with various other apparatus over a transmission medium. Depending upon the nature of the apparatus, a user interface 614 (e.g., keypad, display, speaker, microphone, joystick) may also be provided.

The processor 606 is responsible for managing the bus 604 and general processing, including the execution of software stored on the computer-readable medium 608. The software, when executed by the processor 606, causes the processing system 602 to perform the various functions described infra for any particular apparatus. The computer-readable medium 608 may also be used for storing data that is manipulated by the processor 606 when executing software.

The computer-readable medium 608 can store access manager 104 and extended access barring component 106 when apparatus 600 is specially programmed to operate as UE 102 (FIG. 1). Alternatively, the computer-readable medium 608 can store access controller 115 when apparatus 600 is specially programmed to operate as node 110 or RNC 112 (FIG. 1).

Additional aspects of the present apparatus and methods are described in Appendix A, which is attached hereto.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of accessing a communication network, the method comprising:
   obtaining extended access barring (EAB) data by a user equipment (UE), wherein the EAB data comprises an EAB uniform delay parameter that is a function of a total number of devices in a cell and a number of signatures available for random access channel (RACH) procedures;
   computing a uniform distribution parameter;
   determining an access bar period, wherein the access bar period has a variable duration that is a function of at least the EAB uniform delay parameter and the uniform distribution parameter; and
   initiating an access procedure to access the communication network after waiting at least the access bar period.

2. The method of claim 1, wherein computing the uniform distribution parameter further comprises selecting a random number in an interval between zero and a uniform delay spread value, and wherein initiating the access procedure further comprises initiating a random access procedure.

3. The method of claim 1, wherein the EAB data further comprises a plurality of access permission values corresponding to a plurality of EAB classes, wherein one access permission value of the plurality of access permission values indicates that network access is allowed and provides the EAB uniform delay parameter.

4. The method of claim 1, wherein the EAB uniform delay parameter has a value that varies as a function of a number of access attempts received by a network entity in the communication network.

5. The method of claim 3, wherein the EAB uniform delay parameter is a function of a determined amount of time that a device occupies a RACH signature in order to complete an uplink transmission.

6. The method of claim 5, wherein:

$$W > \frac{N * T}{S}$$

wherein W is the EAB uniform delay parameter, N is the total number of devices in the cell, S is the number of signatures available for RACH procedures, and T is the determined amount of time the device occupies the RACH signature in order to complete the uplink transmission.

7. The method of claim 1, wherein the EAB uniform delay parameter has a value that varies as a function of a random access attempt intensity of connections a core network can support from a cell.

8. The method of claim 7, wherein:

$$W > \max\left(\frac{N}{G}, \frac{N * T}{S}\right)$$

wherein W is the EAB uniform delay parameter, N is the total number of devices in the cell, S is the number of signatures available for RACH procedures, and T is a determined amount of time the device occupies the RACH signature in order to complete the uplink transmission, and G is a random access attempt intensity of connections the core network can support from the cell.

9. The method of claim 3, further comprising:
   identifying an EAB class of the UE of the plurality of EAB classes; and
   determining, based at least on the EAB class of the UE and the plurality of access permission values, whether an access permission value associated with the UE allows network access for the UE.

10. The method of claim 9, further comprising:
    determining, where network access is allowed for the UE, that the UE must wait the access bar period before initiating the access procedure to access the communication network based at least on the access permission value associated with the UE containing the EAB uniform delay parameter.

11. The method of claim 1, further comprising waiting until a paging wake up time, after waiting the access bar period, before the initiating of the access procedure to access the communication network.

12. The method of claim 1, wherein the access bar period comprises an amount of time or a number of paging cycles.

13. The method of claim 1, wherein the access bar period is additionally a function of at least one of a service domain, a mobile originated (MO) or a mobile terminated (MT) access type, a call type, a service type, or a radio resource control (RRC) state.

14. A computer program product for accessing a communication network, comprising:
    a non-transitory computer readable medium, comprising:

at least one instruction executable to cause a computer to obtain extended access barring (EAB) data at a user equipment (UE), wherein the EAB data comprises an EAB uniform delay parameter that is a function of a total number of devices in a cell and a number of signatures available for random access channel (RACH) procedures;

at least one instruction executable to cause a computer to compute a uniform distribution parameter;

at least one instruction executable to cause a computer to determine an access bar period, wherein the access bar period has a variable duration that is a function of at least the EAB uniform delay parameter and the uniform distribution parameter; and at least one instruction executable to cause a computer to initiate an access procedure to access the communication network after waiting at least the access bar period.

15. At least one processor for accessing a communication network, the at least one processor comprising a plurality of modules comprising hardware, wherein the plurality of modules comprise:

a first module to obtain extended access barring (EAB) data by a user equipment (UE), wherein the EAB data comprises an EAB uniform delay parameter that is a function of a total number of devices in a cell and a number of signatures available for random access channel (RACH) procedures;

a second module to compute a uniform distribution parameter;

a third module to determine an access bar period, wherein the access bar period has a variable duration that is a function of at least the EAB uniform delay parameter and the uniform distribution parameter; and a fourth module to initiate an access procedure to access the communication network after waiting at least the access bar period.

16. A user equipment apparatus for accessing a communication network, comprising:

means for obtaining extended access barring (EAB) data by a user equipment (UE), wherein the EAB data comprises an EAB uniform delay parameter that is a function of a total number of devices in a cell and a number of signatures available for random access channel (RACH) procedures;

means for computing a uniform distribution parameter;

means for determining an access bar period, wherein the access bar period has a variable duration that is based on at least the EAB uniform delay parameter and the uniform distribution parameter; and means for initiating an access procedure to access the communication network after waiting at least the access bar period.

17. A user equipment (UE) apparatus for accessing a communication network, comprising:

an access manager comprising hardware and configured to manage one or more communication network access attempts by the UE apparatus; and an extended access barring component comprising hardware and including a uniform distribution parameter and an extended access barring (EAB) uniform delay parameter that is a function of a total number of devices in a cell and a number of signatures available for random access channel (RACH) procedures, configured to cause the access manager to wait an access bar period before attempting to access the communication network, wherein the access bar period has a variable duration that is a function of the uniform distribution parameter and the EAB uniform delay parameter, and configured to cause the access manager to initiate an access procedure to access the communication network after waiting the access bar period.

18. A method of controlling access in a communication network, comprising:

receiving, by a network apparatus, a delay tolerance classification of a user equipment (UE) in association with a request for access to the communication network;

selecting an extended access barring (EAB) parameter from a plurality of EAB parameters based on the delay tolerance classification, wherein the EAB parameter comprises an EAB uniform delay parameter that is a function of a total number of devices in a cell and a number of signatures available for random access channel (RACH) procedures; and transmitting the EAB uniform delay parameter to the UE, wherein the EAB uniform delay parameter causes the UE to wait an access bar period before attempting to access the communication network, and wherein the access bar period has a variable duration that is a function of at least the EAB uniform delay parameter and a uniform distribution parameter.

19. A computer program product for controlling access in a communication network, comprising:

a non-transitory computer readable medium, comprising:

at least one instruction executable to cause a computer to receive a delay tolerance classification from a user equipment (UE) in association with a request for access to the communication network;

at least one instruction executable to cause the computer to select an extended access barring (EAB) parameter from a plurality of different EAB parameters based on the delay tolerance classification, wherein the EAB parameter comprises an EAB uniform delay parameter that is a function of a total number of devices in a cell and a number of signatures available for random access channel (RACH) procedures; and at least one instruction executable to cause the computer to transmit the EAB uniform delay parameter to the UE, wherein the EAB uniform delay parameter causes the UE to wait an access bar period before attempting to access the communication network, and wherein the access bar period has a variable duration that is a function of at least the EAB uniform delay parameter and a uniform distribution parameter.

20. At least one processor for controlling access in a communication network, the at least one processor comprising a plurality of modules comprising hardware, wherein the plurality of modules comprise:

a first module to receive a delay tolerance classification from a user equipment (UE) in association with a request for access to the communication network;

a second module to select an extended access barring (EAB) parameter from a plurality of different EAB parameters based on the delay tolerance classification, wherein the EAB parameter comprises an EAB uniform delay parameter that is a function of a total number of devices in a cell and a number of signatures available for random access channel (RACH) procedures; and a third module to transmit the EAB uniform delay parameter to the UE, wherein the EAB uniform delay parameter causes the UE to wait an access bar period before attempting to access the communication network, and wherein the access bar period has a variable duration that is a function of at least the EAB uniform delay parameter and a uniform distribution parameter.

21. A network apparatus for controlling access in a communication network, comprising:

means for receiving a delay tolerance classification from a user equipment (UE) in association with a request for access to the communication network;

means for selecting an extended access barring (EAB) parameter from a plurality of different EAB parameters based on the delay tolerance classification, wherein the EAB parameter comprises an EAB uniform delay parameter that is a function of a total number of devices in a cell and a number of signatures available for random access channel (RACH) procedures; and means for transmitting the EAB uniform delay parameter to the UE, wherein the EAB uniform delay parameter causes the UE to wait an access bar period before attempting to access the communication network, and wherein the access bar period has a variable duration that is a function of at least the EAB uniform delay parameter and a uniform distribution parameter.

* * * * *